United States Patent
Chen et al.

(10) Patent No.: US 10,038,602 B2
(45) Date of Patent: Jul. 31, 2018

(54) MONITORING RESOURCE CONSUMPTION BASED ON FIXED COST FOR THRESHOLD USE AND ADDITIONAL COST FOR USE ABOVE THE THRESHOLD

(71) Applicant: International Business Machines Corporation, Armonk, NY (US)

(72) Inventors: Bei Chen, Dublin (IE); Vincent P.A. Lonij, Dublin (IE); Jakub Marecek, Dublin (IE)

(73) Assignee: International Business Machines Corporation, Armonk, NY (US)

(*) Notice: Subject to any disclaimer, the term of this patent is extended or adjusted under 35 U.S.C. 154(b) by 152 days.

(21) Appl. No.: 15/180,196

(22) Filed: Jun. 13, 2016

(65) Prior Publication Data
US 2017/0359233 A1    Dec. 14, 2017

(51) Int. Cl.
*H04L 12/28* (2006.01)
*H04L 12/24* (2006.01)
*H04L 29/08* (2006.01)

(52) U.S. Cl.
CPC ...... *H04L 41/5077* (2013.01); *H04L 12/2803* (2013.01); *H04L 12/2814* (2013.01);
(Continued)

(58) Field of Classification Search
CPC . G06F 17/30471; G06F 9/5072; G06Q 10/06; G06Q 30/016; G06Q 30/0206;
(Continued)

(56) References Cited

U.S. PATENT DOCUMENTS 7,451,017 B2    11/2008    McNally
7,512,540 B2    3/2009    Gluck et al.
(Continued)

FOREIGN PATENT DOCUMENTS

WO    2012048231 A1    4/2012

OTHER PUBLICATIONS

Sebastian Matthias Braun, "Business Models in Smart Grids: A Residential Sector Focused Energy Service Company," Norwegian University of Science and Technology, Department of Industrial Economics and Technology Management, Master Thesis, Jun. 13, 2014, 137 pages.
(Continued)

*Primary Examiner* — Le H Luu
(74) *Attorney, Agent, or Firm* — Kurt P. Goudy; Ryan, Mason & Lewis, LLP

(57) ABSTRACT

A method includes establishing a cost for consumption of a given resource by a given resource consumer for a designated period of time, the cost comprising a fixed cost for consumption of the given resource up to a threshold consumption level for the designated time period and an additional cost associated with consumption of the given resource exceeding the threshold consumption level for the designated period of time, monitoring consumption of the given resource by the given resource consumer, determining whether resource consumption by the given resource consumer is projected to exceed the threshold consumption level over the designated time period, generating an alert responsive to determining that resource consumption by the given resource consumer is projected to exceed the threshold consumption level over the designated time period, and providing the alert for presentation via a user interface of a user device associated with the given resource consumer.

20 Claims, 8 Drawing Sheets

(52) U.S. Cl.
CPC ...... *H04L 12/2816* (2013.01); *H04L 12/2823* (2013.01); *H04L 12/2827* (2013.01); *H04L 67/14* (2013.01)

(58) Field of Classification Search
CPC .... G06Q 30/02; G06Q 50/06; H04L 12/1453; H04L 41/18; H04L 67/2809; H04L 12/2803; H04L 12/2814; H04L 12/2816; H04L 12/2823; H04L 12/2827; H04L 41/5077; H04L 67/14; H04W 4/008; H04W 80/045

See application file for complete search history.

(56) References Cited

U.S. PATENT DOCUMENTS

| | | | |
|---|---|---|---|
| 7,698,219 B2 | 4/2010 | Kremen et al. | |
| 7,890,436 B2 | 2/2011 | Kremen | |
| 8,386,369 B2 | 2/2013 | Warnick | |
| 8,543,343 B2 | 9/2013 | Jones et al. | |
| 8,560,133 B2 | 10/2013 | Venkatakrishnan et al. | |
| 9,218,632 B2 | 12/2015 | Venkatakrishnan et al. | |
| 2006/0059253 A1* | 3/2006 | Goodman | G06Q 10/06 709/223 |
| 2006/0123079 A1* | 6/2006 | Sturniolo | H04W 80/045 709/203 |
| 2009/0240602 A1 | 9/2009 | Mohr et al. | |
| 2009/0281677 A1 | 11/2009 | Botich et al. | |
| 2009/0319090 A1 | 12/2009 | Dillon et al. | |
| 2010/0305998 A1 | 12/2010 | de la Torre Bueno et al. | |
| 2012/0226796 A1* | 9/2012 | Morgan | H04L 12/1453 709/224 |
| 2013/0085984 A1* | 4/2013 | Burger | G06F 17/30471 707/609 |
| 2013/0204668 A1 | 8/2013 | Schneier et al. | |
| 2013/0262654 A1* | 10/2013 | Masli | G06Q 50/06 709/224 |
| 2013/0305322 A1* | 11/2013 | Raleigh | G06Q 30/016 726/4 |
| 2014/0278807 A1* | 9/2014 | Bohacek | G06Q 30/0206 705/7.35 |
| 2015/0222723 A1* | 8/2015 | Adapalli | H04L 67/2809 705/26.41 |
| 2015/0295788 A1* | 10/2015 | Witzman | H04L 41/18 709/224 |
| 2016/0142868 A1* | 5/2016 | Kulkarni | H04W 4/008 455/456.5 |
| 2016/0253710 A1* | 9/2016 | Publicover | G06Q 30/02 705/14.66 |
| 2016/0266939 A1* | 9/2016 | Shear | G06F 9/5072 |

OTHER PUBLICATIONS

A. Cabraal et al., "Accelerating Sustainable PV Market Development," Asia Alternative Energy Program (ASTAE), The World Bank, 1999, 8 pages.

T. Levin et al., "Utility-Maximizing Financial Contracts for Distributed Rural Electrification," Energy, May 1, 2014, pp. 613-621, vol. 69.

G. Barbose et al., "Real Time Pricing as a Default or Optional Service for C&I Customers: A Comparative Analysis of Eight Case Studies," University of California, Ernest Orlando Lawrence Berkeley National Laboratory, Aug. 1, 2005, 107 pages.

P. Komor et al., "Energy Use, Information, and Behavior in Small Commercial Buildings," Princeton University, PU/CEES Report No. 240, Jul. 1989, 39 pages.

L.S. Ting et al., "Promoting Energy Conservation Behaviour: A Plausible Solution to Energy Sustainability Threats," International Proceedings of Economics Development & Research, Mar. 2011, pp. 372-376, vol. 5, No. 1, Singapore, Asia.

Teresa Parejo-Navajas, "The Energy Improvement of the Urban Existing Building Stock: A Proposal for Action Arising from Best Practice Examples," This paper was prepared as part of a research conducted at the Sabin Center for Climate Change Law, Columbia Law School (Columbia University), May 26, 2015, 36 pages.

Wikipedia, "Energy Service Company," https://en.wikipedia.org/wiki/Energy_service_company, Feb. 24, 2016, 10 pages.

J. Nie et al., "Bilevel Polynomial Programs and Semidefinite Relaxation Methods," arXiv:1508:06985v1, Aug. 27, 2016, 22 pages.

V. Jeyakumar et al., "Convergent Semidefinite Programming Relaxations for Global Bilevel Polynomial Optimization Problems," arXiv:1506.02099v2, Jan. 13, 2016, 31 pages.

* cited by examiner

100

500

MONITORING RESOURCE CONSUMPTION BASED ON FIXED COST FOR THRESHOLD USE AND ADDITIONAL COST FOR USE ABOVE THE THRESHOLD

BACKGROUND

The present application relates to resource consumption, and more specifically, to techniques for monitoring resource consumption. Resource consumption, such as energy use, can vary greatly by different users. A household may be considered an example of such a user. Energy costs for a household may be reduced by implementing energy efficiency measures. In some cases, users may be unaware of the potential savings resulting from implementing energy efficiency measures. In other cases, users may be aware of the potential savings but the costs associated with implementing the energy efficiency measures may be prohibitive. As an example, a homeowner may not have the available capital to implement costly energy efficiency measures. While financing may be an option, a homeowner may not wish to take out a loan for various reasons. Energy savings companies can offer service contracts to users, which can allow the users to implement energy efficiency measures without having to utilize capital or potentially undesirable financing options. Thus, pairing energy savings companies and users can provide benefits to both parties in terms of reduced costs, as well as overall benefits in reducing energy usage.

SUMMARY

Embodiments of the invention provide techniques for monitoring resource consumption.

For example, in one embodiment, a method comprises establishing a cost for consumption of a given resource by a given resource consumer for a designated period of time, the cost comprising a fixed cost for consumption of the given resource up to a threshold consumption level for the designated time period and an additional cost associated with consumption of the given resource exceeding the threshold consumption level for the designated period of time, monitoring consumption of the given resource by the given resource consumer, determining whether resource consumption by the given resource consumer is projected to exceed the threshold consumption level over the designated time period, generating an alert responsive to determining that resource consumption by the given resource consumer is projected to exceed the threshold consumption level over the designated time period, and providing the alert for presentation via a user interface of a user device associated with the given resource consumer, wherein the method is performed by at least one processing device comprising a processor coupled to a memory.

DETAILED DESCRIPTION

Illustrative embodiments of the invention may be described herein in the context of illustrative methods, systems and devices for monitoring resource consumption. However, it is to be understood that embodiments of the invention are not limited to the illustrative methods, systems and devices but instead are more broadly applicable to other suitable methods, systems and devices.

Figure 1:
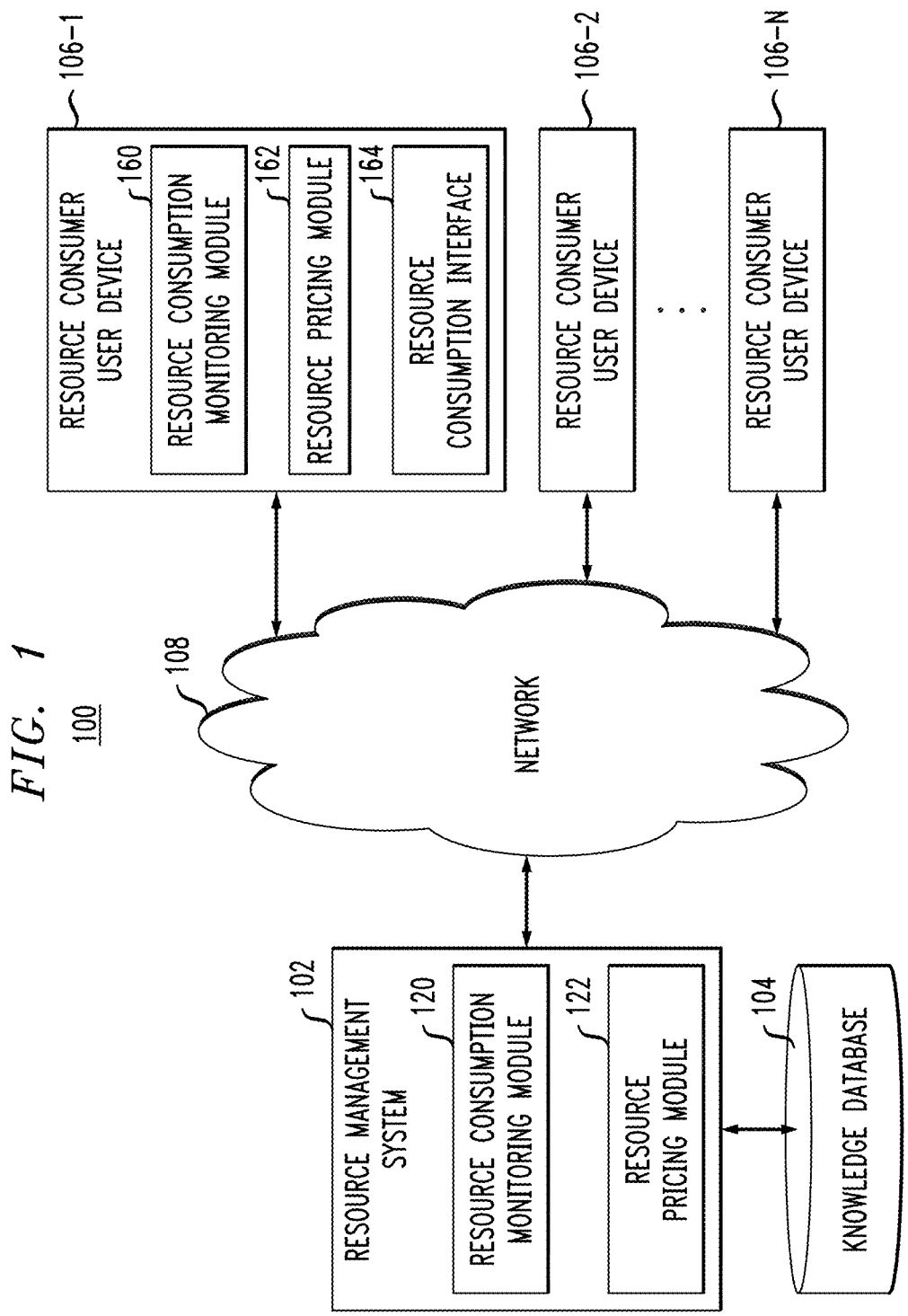
FIG. 1 depicts a system for monitoring resource consumption, according to an embodiment of the present invention.

FIG. 1 shows a system 100 for monitoring resource consumption, including a resource management system 102 connected to a knowledge database 104. The resource management system 102 is connected to resource consumer user device 106-1, resource consumer user device 106-2, . . . , resource consumer user device 106-N, collectively referred to herein as resource consumer user devices 106, via network 108.

The resource management system 102, as shown, includes a resource consumption monitoring module 120 and a resource pricing module 122. The resource consumer user device 106-1 is also shown including a resource consumption monitoring module 160 and a resource pricing module 162, along with a resource consumption interface 164. Although not explicitly shown in FIG. 1 for clarity, other ones of the resource consumer user devices 106 may also include resource consumption monitoring modules, resource pricing modules and resource consumption interfaces.

The resource consumption monitoring module 120 of resource management system 102 is configured so as to monitor the consumption of one or more resources, such as energy, water, natural gas, oil, etc. by resource consumers, such as households or other facilities. Each resource consumer may have an associated user device, such as one of the resource consumer user devices 106 shown in FIG. 1. The resource consumer user devices 106 may be smart meters coupled with or otherwise associated with a resource consumer/facility. Resource consumer user devices 106 may alternately be other processing or computing devices. By way of example, resource consumer user device 106-1 may be a smartphone, tablet, laptop, smartwatch, desktop, etc. that is configured for communication over network 108 with the resource management system 102 and/or a smart meter at a facility associated with a particular resource consumer.

While the resource consumption monitoring module 120 of resource management system 102 can be configured for monitoring resource consumption by multiple resource consumers, the resource consumption monitoring module 160 of resource consumer user device 106 in some embodiments is configured to monitor resource consumption for a particular user rather than a group of users. In other embodiments, however, resource consumption monitoring module 160 may monitor resource consumption by a group of resource consumers, possibly for checking whether resource consumption for a particular resource consumer is expected to exceed a threshold consumption level in a designated time period as will be discussed in further detail below.

Resource pricing module 122 of resource management system 102 and resource pricing module 162 of resource consumer user device 106-1 are configured to establish a cost for consumption or one or more resources by one or more resource consumers, either independently or via communication with one another over network 108.

Resource consumption interface 164 of resource consumer user device 106-1 provides a user interface allowing a resource consumer to, for example, view information related to past, present and projected resource consumption. This information may include projected prices for resource consumption based on the cost established by the resource pricing module 162 and/or resource pricing module 122. The resource consumption interface 164 may also present one or more user-activatable interface features allowing for the resource consumer to implement actions to alter resource consumption based on the projected prices, as will be described in further detail below.

The resource management system 102 is coupled to knowledge database 104. The knowledge database 104 may store information relating to historical resource consumption by resource consumers, as well as information regarding previous pricing for resource consumption. The knowledge database 104 may further or alternatively store demographic or other information relating to resource consumers and/or their associated facilities. Resource consumption monitoring module 120 may store information relating to resource consumption and resource consumers in the knowledge database 104. Resource pricing module 122 may utilize information stored in the knowledge database 104 for establishing costs for resource consumption by one or more resource consumers.

Although FIG. 1 shows the knowledge database 104 being implemented external to the resource management system 102, embodiments are not limited to this arrangement. In some embodiments, the knowledge database 104 is implemented at least partially internal to the resource management system 102. The knowledge database 104 may also be implemented internal to one or more of the resource consumer user devices 106. In addition, while the knowledge database 104 is shown connected to the resource management system 102 directly, the knowledge database 104 may be connected to resource management system 102, and possibly one or more of the resource consumer user devices 106, via network 108.

Figure 2:
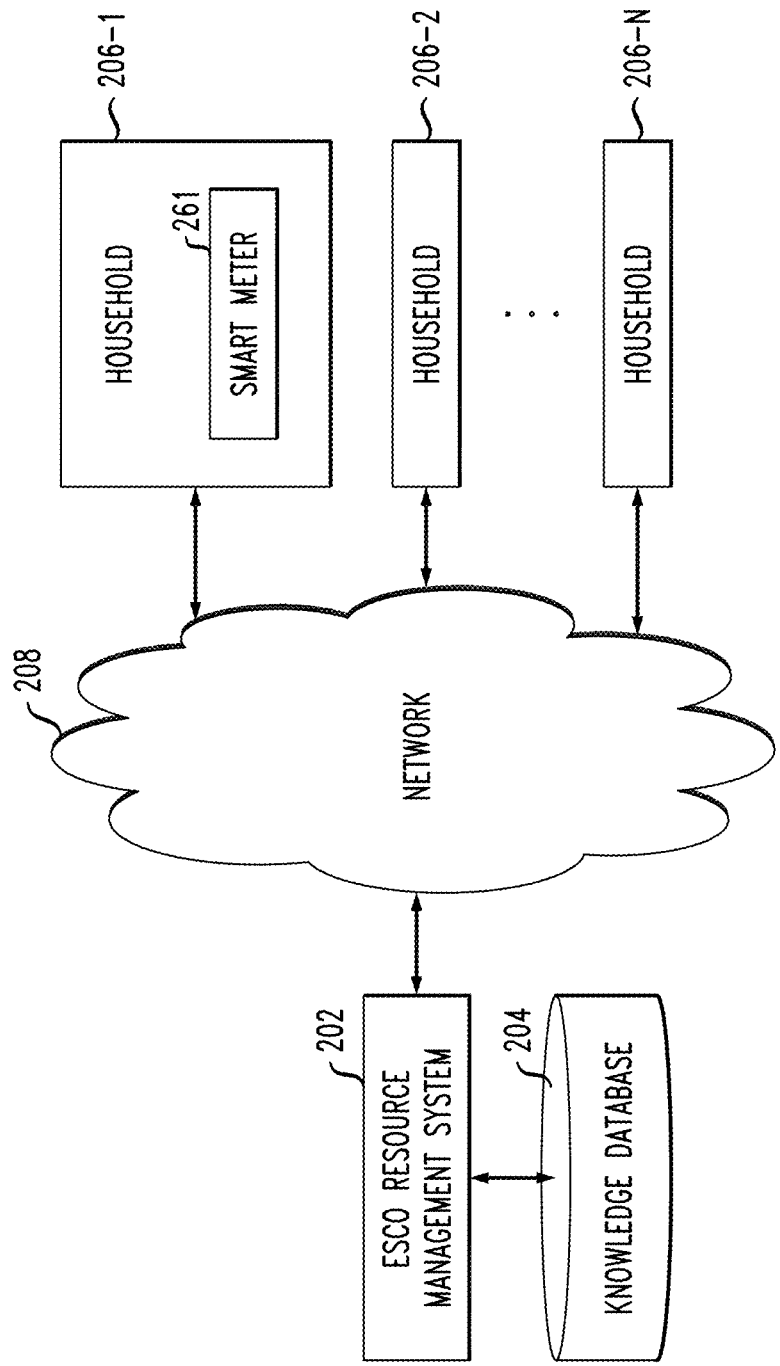
FIG. 2 depicts another system for monitoring resource consumption, according to an embodiment of the present invention.

An energy service company (ESCO) is an example of an entity that implements a resource management system such as the resource management system 102 in system 100. FIG. 2 illustrates a system 200 for monitoring resource consumption including ESCO resource management system 202, also referred to herein as ESCO 202. The system 200 also includes household 206-1, household 206-2, . . . , household 206-N, collectively referred to herein as households 206. Household 206-1 is shown including smart meter 261, which is an example of a resource consumer user device such as resource consumer user device 106-1. Although not explicitly shown in FIG. 2, other ones of the households 206 may include smart meters or other types of resource consumer user devices. The households 206 are examples of facilities associated with a resource consumer. Facilities associated with resource consumers, however, are not limited solely to a household or residential property. Facilities may also include businesses, transportation vehicles such as cars, buses, trains, airplanes, etc. The ESCO 202 is connected to knowledge database 204. The ESCO 202 is also connected to households 206 via network 208.

Heating costs are an example of resource consumption costs that can benefit greatly from implementing energy efficiency measures. It is important to note, however, that heating costs are just one example of resource consumption and that embodiments are not limited solely to monitoring resource consumption associated with space-heating or heating costs. Instead, embodiments may be used in other contexts for other types of resource consumption, including but not limited to electricity, water, natural gas, etc.

Consider, as an example, households in the Irish market. Assume that a given household having a Building Energy Rating (BER) of E1 has heating costs of 300 kWh/m$^2$, approximately €5,101.77 per annum (pa) using current prices. Since the average household in the Irish market has a BER of D1, the given household with a BER of E1 has the potential for significant savings by implementing energy efficiency or energy savings measures. As one example, suppose that installing improved insulation at a cost of €10,000 in the given household would lead to the given household being assigned a BER of C1. The heating costs for BER C1 are 150 kWh/m$^2$, representing a 50% reduction in pa cost equivalent to approximately €2,500 given the sample pricing above. For the owner of the given household, an example of a resource consumer, installing the improved insulation leads to a 25% return on investment (ROI).

For a variety of reasons, the owner of the given household may not implement energy efficiency measures such as installing the improved insulation in the scenario above. As an example, the owner of the given household may not be aware of the specific amount of savings offered by implementing the energy efficiency measures. In other words, while the owner may know that installing improved insulation would decrease heating costs, the owner may not realize that such an investment can offer such a significant ROI. As another example, the owner may not have available the necessary capital for implementing energy efficiency measures, or may not wish to use available capital for this purpose. While the owner may have the option to finance implementing energy efficiency measures, there are a number of factors affecting such a decision for the owner, such as the availability of financing, current interest rates, etc.

One solution to the above situation is for the owner or other resource consumer to enter into a contract with an ESCO. In an example transaction, an ESCO borrows cash to purchase equipment and/or implement energy efficiency measures for a resource consumer. The resource consumer pays the ESCO its normal energy cost or some fraction thereof. In this scenario, the normal energy cost does not take into account the savings provided by implementing the energy efficiency measures. Both parties to this arrangement receive benefits. The resource consumer benefits from stable and possibly reduced costs for resource consumption, in addition to having energy efficiency measures installed with no upfront cost. The ESCO, meanwhile, can utilize any difference between what the resource consumer pays the ESCO and the actual cost for resource consumption to cover the costs of implementing the energy efficiency measures, e.g., interest on loans taken out to fund the implementation of energy efficiency measures. This difference between the actual cost of resource consumption and what the resource consumer pays the ESCO may also provide the ESCO with a positive ROI. In some cases, the ESCO is better positioned to finance the implementation of energy efficiency measures relative to the resource consumer. For example, the ESCO may, by virtue of having contracts with multiple resource consumers, receive volume savings benefits or reduced costs for the equipment or materials used in implementing energy efficiency measures that would not normally be available to an individual resource consumer.

Consider an example transaction between an ESCO and a resource consumer. The ESCO may offer to the resource consumer a contract with no up-front costs and a 20% reduction in energy costs to the consumer, e.g., the homeowner would pay 80% of his or her normal or historical energy cost. Given such an arrangement, the homeowner benefits in reduced energy costs and the ESCO realizes an 8% ROI. If the resource consumer, for example, had a borrowing cost of 12%, the resource consumer can benefit from utilizing the ESCO rather than self-financing energy efficiency measures.

Contracts between ESCOs and resource consumers can take a number of different forms depending on the fee structure. In leasing or Build-Own-Operate-Transfer (BOOT) type contracts, the costs for the resource consumer are the current energy bill of the resource consumer plus a fee to cover investment costs, maintenance costs and the financing costs of the ESCO. This is attractive for the resource consumer as the current energy bill reflects the savings provided by implementing energy efficiency measures.

In shared savings type contracts, resource consumers are billed for some convex combination of a historical energy bill and the current energy bill.

In guaranteed savings type contracts, resource consumers are billed for a minimum of: some convex combination of a historical energy bill and the current energy bill; and the historical energy bill minus a percentage savings.

In chauffage type contracts, resource consumers are billed based on the historical energy bill minus a percentage saving. The percentage saving is often in the range of 5-10%, but is not limited to this range.

Some embodiments provide for improvements or extensions of chauffage type contracts for resource usage, including pricing of such contracts, monitoring resource usage in such contracts, and providing mechanisms to alter resource consumption in a facility based on projected costs established by such contracts.

ESCO contracts may be viewed, at least in part, as exercises in risk management. ESCO contracts are subject to a variety of risks, including but not limited to fuel cost risk (e.g., the base cost of energy or some other resource can fluctuate), performance and design risk (e.g., that implemented energy efficiency measures may not work as expected), investment repayment risk (e.g., an ESCO becomes insolvent), customer credit risk (e.g., a customer becomes insolvent), regulatory risks (e.g., changing legal environments for ESCOs and their contracts), etc.

The various types of ESCO contracts described above may be classified at least in part based on which party or parties assume which risks. In leasing or BOOT type contracts, the resource consumer assumes the performance risk. In shared savings type contracts, performance risks are shared between the ESCO and the resource consumer. In guaranteed savings type contracts, the ESCO assumes the performance risk. Chauffage type contracts, from a risk perspective, are a form of the guaranteed savings type contracts wherein the ESCO assumes a greater performance risk due to the rebound effect described below.

Investment repayment risk, e.g., that an ESCO becomes insolvent, is usually assumed by the resource consumer but may be hedged away using financial instruments such as credit default swaps. Customer credit risk is usually shared between the ESCO and its creditors, e.g., banks, investors, etc. In guaranteed savings type contracts, the customer credit risk may be assumed at least in part by the creditors of the ESCO.

BOOT-type contracts, for example, can provide a maximum return for the resource consumer. In BOOT-type contracts, however, the resource consumer also assumes the performance risk. In contrast, the ESCO assumes the performance risk in chauffage type contracts. As such, chauffage type contracts may be more appealing to the resource consumer than the ESCO. Some embodiments provide extensions or improvements in chauffage type contracts to lower the performance risk assumed by the ESCO resulting from the rebound effect, which will be described in further detail below, thus making chauffage type contracts appealing for both the resource consumer and the ESCO.

The rebound effect refers to a tendency of resource consumers to change their behavior and consume more energy or other resources after installing energy efficiency measures. As an example, a 50% per-square-meter technical reduction of energy use may result in only a 30% actual or overall reduction of energy use. Chauffage type contracts are particularly sensitive to the rebound effect. Embodiments, among other advantages, can provide an extension for chauffage type contracts that reduces the performance risk resulting from the rebound effect.

In some embodiments, the cost for consumption of a given resource is established in accordance with a new type of energy savings contract. Embodiments also provide techniques for pricing such contracts, including by way of example optimizing parameters of the contracts with respect to yield. Parameters include but are not limited to energy efficiency measures to offer, a percentage of recent resource consumption costs, a threshold resource consumption level such as a percentile of a reference group of resource consumers, a duration, etc. These and other parameters may be optimized using behavioral models, using a number of factors including but not limited to interest rates, resource costs, hedging costs, etc.

The resource management system 102 or ESCO 202 can interact with resource consumers via resource consumer user devices 106 or smart meters or other user devices associated with households 206 to establish costs for resource consumption over some defined time period. In some embodiments, this may involve: surveying a client site of the resource consumer, such as a home or other facility; proposing certain energy efficiency measures such as installation of external wall insulation; and proposing a reference group of similar resource consumers, such as neighbors or other users that have had similar energy efficiency measures installed. The resource management system 102 or ESCO 202 can then offer the resource consumer a subscription style contract or other arrangement under which the resource consumption costs for the resource consumer are kept constant, e.g., at a fraction of current resource consumption costs, provided that the resource consumer keeps resource consumption below an agreed upon threshold consumption level that is defined relative to the reference group of similar resource consumers within a designated period of time, e.g., a month, year, etc. The subscription style contract includes an additional cost, also referred to herein as a disincentive or penalty, where the additional cost is paid for resource consumption above the threshold consumption level, e.g., energy use beyond or above the energy use of a specified percentile of the reference group within the designated period of time.

If the ESCO and the resource consumer agree on an established cost for resource consumption, the ESCO can obtain financial resources needed to implement energy efficiency measures for the resource consumer and then implement those energy efficiency measures. The resource consumer then pays the ESCO the established cost, e.g., the agreed upon fixed cost at regular intervals, except for times when resource consumption by the resource consumer exceeds the threshold consumption level. When the resource consumer exceeds the threshold consumption level for the designated period of time, the resource consumer pays the additional cost. As an example, the threshold consumption level may be set at 80% of the reference group. In this example, the resource consumer would pay the additional cost when the resource consumer is among the top 20% of heaviest resource consumers within the reference group.

Once the cost for resource consumption is established, resource consumption is monitored by one or both of the resource consumer and the ESCO/resource management system. The monitoring may be continuous over a designated period of time, and updates may be provided to the resource consumer, such as via a smart meter or other user device associated with the resource consumer. These updates may take the form of a visualization or other measure of current resource consumption, current resource consumption cost, projected resource consumption, projected resource consumption cost, etc.

Specific alerts may be generated if it is determined that projected resource consumption will exceed the threshold consumption level in the established cost. The alert may warn the resource consumer that an additional cost may have to be paid, along with the projected amount of the additional cost, also referred to herein as a projected penalty cost. The alert may also trigger the user device or smart meter to present user-activatable interface features providing the resource consumer with options so as to alter their resource consumption to at least partially reduce the projected additional cost. In some cases, the alert may actually cause the implementation of such measures automatically in accordance with user preferences. As an example, the alert may cause a smart meter to alter the setpoint temperature of a thermostat so as to reduce space-heating costs.

Figure 3:
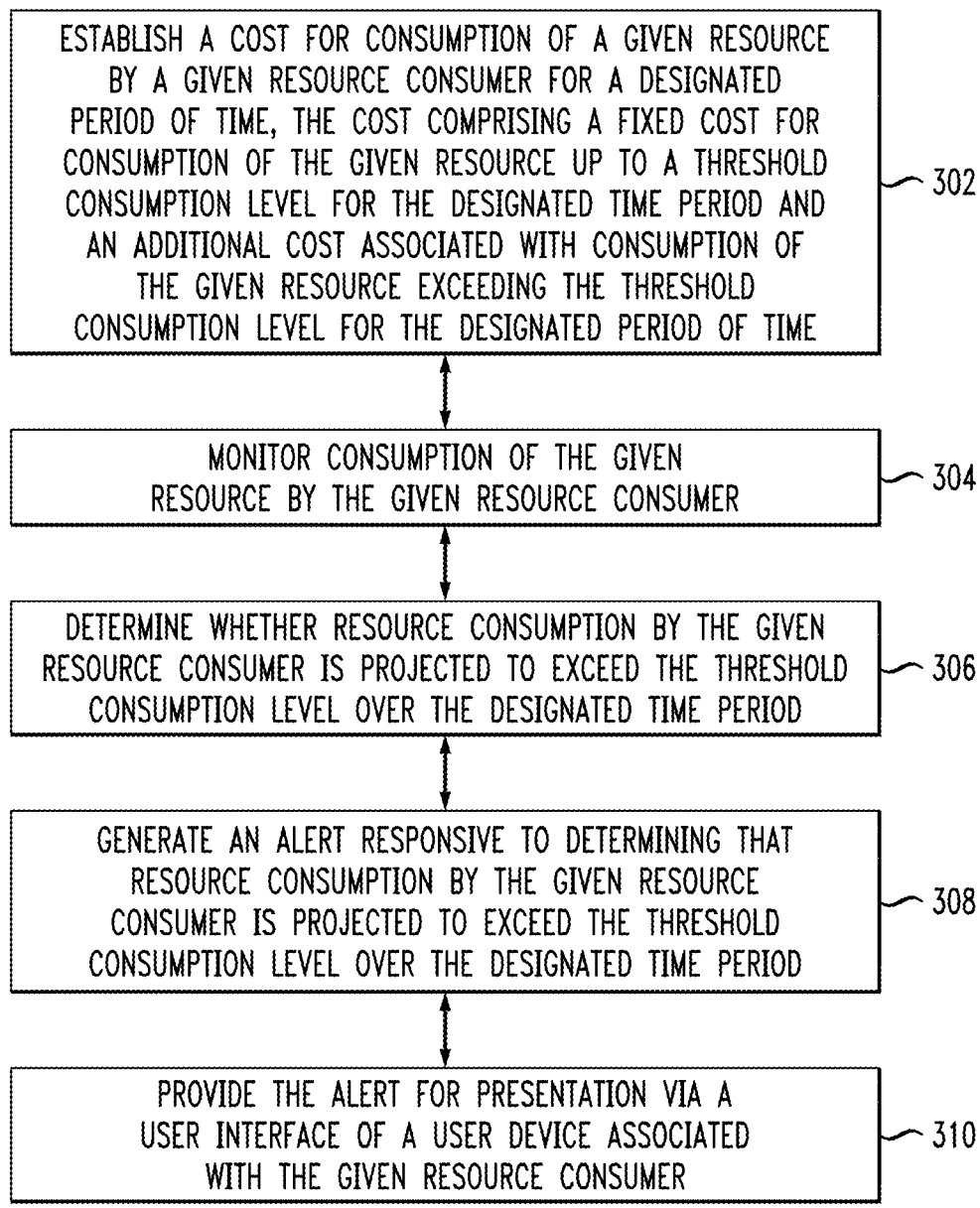
FIG. 3 depicts a process for monitoring resource consumption, according to an embodiment of the present invention.

FIG. 3 shows a process 300 for monitoring resource consumption. The process 300 may be performed by one or more of the resource management system 102 and resource consumer user devices 106 in system 100, or the ESCO 202 and households 206 in system 200. The process 300 begins with step 302, establishing a cost for consumption of a given resource by a given resource consumer for a designated period of time. The cost includes: (1) a fixed cost for consumption of the given resource up to a threshold consumption level for the designated time period; and (2) an additional cost associated with consumption of the given resource exceeding the threshold consumption level for the designated period of time.

Establishing the cost in step 302 may, in some embodiments, include selecting parameters such as the fixed cost, the threshold consumption level and the additional cost so as to increase or optimize the ROI for the given resource consumer and/or the party providing the given resource to the given resource consumer, e.g., an ESCO. For example, step 302 may include selecting the fixed cost, the threshold consumption level and the additional cost so as to increase the ROI for the resource consumer, to increase the ROI for a party providing the given resource to the given consumer, or both. Step 302 may also include establishing the cost subject to constraints on savings to the resource consumer, ROI for the party providing the given resource to the given resource consumer, or both.

Establishing the cost for consumption of the given resource in step 302 may further include obtaining one or more parameters of a facility associated with the given resource consumer, determining a reference group of resource consumers based on the obtained parameters, and setting the threshold consumption level based on historical resource consumption by the reference group. The one or more parameters of the facility may include, by way of example, one or more energy efficiency measures implemented in the facility, one or more volumetric measures of the facility, the location of the facility, and occupancy information of the facility including a number of occupants and demographic information associated with the occupants.

The reference group may be determined by identifying one or more other resource consumers having associated facilities with parameter values within respective threshold distances of the parameters of the facility associated with the given resource consumer. The reference group may itself comprise or otherwise include the identified resource consumers. The identities of the resource consumers in the reference group, in some embodiments, may be anonymized. There are various reasons to anonymize the identities of the resource consumers in the reference group. The identities may be anonymized for privacy concerns possibly to comply with laws or other regulations. Also consider, as an example, a threshold consumption level set at the $80^{th}$ percentile of the reference group. In a normal scenario, this threshold may be set to so as to ensure that both the given resource consumer and the party providing the given resource to the given resource consumer achieve an acceptable ROI. However, if the reference group as a whole increases resource consumption significantly, the party providing the given resource to the given resource consumer may not achieve an acceptable ROI or may even have a negative ROI. While resource consumption patterns may vary for a number of reasons, anonymizing the identities of the reference group can help avoid any coordinated behavior relating to resource consumption that may negatively impact the ROI for the party providing the given resource to the given resource consumer.

In some embodiments, the threshold consumption level established in step 302 is dynamically updated based on resource consumption by the reference group. As described above, for example, the reference group as a whole may increase or decrease resource consumption due to a number of factors. Such factors include, by way of example, weather conditions. In some cases, this may lead to increased resource consumption such as increased costs for cooling due to a heat wave. In other cases, this may lead to reduced resource consumption, such as lowered costs for heating in a mild winter. Dynamically updating the threshold consumption level can account for such variations to the benefit of both the given resource consumer and the party providing the given resource to the given resource consumer. In other embodiments, the threshold consumption level is fixed for some specified period of time, such as a month or a year, and updated after each period based on the resource consumption of the reference group.

The fixed cost that is established in step 302 may be a fraction of historical costs associated with consumption of the given resource by the given resource consumer. Thus, the given resource consumer benefits from reduced cost for resource consumption. The particular fraction of the historical costs may be selected so as to at least partially offset the costs of implementing energy efficiency measures. In some embodiments, the fixed cost is indexed to at least one of future resource consumption by the reference group, a price associated with providing the given resource to the given resource consumer, and one or more covariates of consumption of the given resource.

In some embodiments, the fixed cost itself is irrespective of actual consumption of the given resource by the given resource consumer, subject to that use not exceeding the threshold consumption level. In other embodiments, however, multiple threshold consumption levels may be set. As an example, an upper threshold consumption level may be set whereby an additional cost is paid by the given resource consumer for exceeding the upper threshold consumption level. A lower threshold consumption level may also be set, whereby a discount or rebate to the fixed cost is provided to the given resource consumer when resource consumption is below the lower threshold consumption level. As described elsewhere herein, alerts and projected additional costs may be provided for presentation via a user interface of a user device associated with the given resource consumer when resource consumption is projected to exceed the upper threshold consumption level. Alerts and projected savings may also be provided for presentation via the user interface of the user device associated with the given resource consumer when resource consumption is projected to be below the lower threshold consumption level.

The process 300 continues with step 304, monitoring consumption of the given resource by the given resource consumer. In step 306, a determination is made as to whether resource consumption by the given resource consumer is projected to exceed the threshold consumption level over the designated time period. Responsive to determining that resource consumption by the given resource consumer is projected to exceed the threshold consumption level over the designated time period, an alert is generated in step 308. The alert is provided for presentation via a user interface of a user device associated with the given resource consumer in step 310.

In some embodiments, steps 304 through 310 may be performed by the user device associated with the given resource consumer. For example, a smart meter associated with the given resource consumer may perform steps 304 through 310, and provide the alert for presentation via a user interface of the smart meter itself, via a user interface of some other user device associated with the given resource consumer such as a smartphone, or both. In other embodiments, steps 304 through 310 may be performed by resource management system 102 or ESCO 202, where the alert is transmitted over network 108 or 208 to one or more of the resource consumer user devices 106 or households 206. In some embodiments, one or more of steps 304 through 310 may be performed at least in part by both the resource management system 102/ESCO 202 and the resource consumer user devices 106/households 206.

The alert generated in step 308 and provided for presentation via the user interface in step 310 may include a projected additional cost associated with exceeding the threshold consumption level over the designated time period based on projected resource consumption over the designated time period. Providing the alert for presentation via the user interface in step 310, in some embodiments, includes invoking a user interface application on the user device to display the projected additional cost, possibly via one or more application programming interfaces (APIs) of the user device. Invoking the user interface application on the user device may include presenting one or more user-activatable interface features to implement corresponding recommendations for reducing the projected additional cost. Invoking the user application may also include automatically implementing one or more of the corresponding recommendations for reducing the projected additional cost without requiring further input by the resource consumer. For example, a setpoint of a thermostat or water heater may be adjusted, a duty cycle of a water heater or heating system may be altered, certain resource-consuming devices or features may be disabled, etc.

Figure 4:
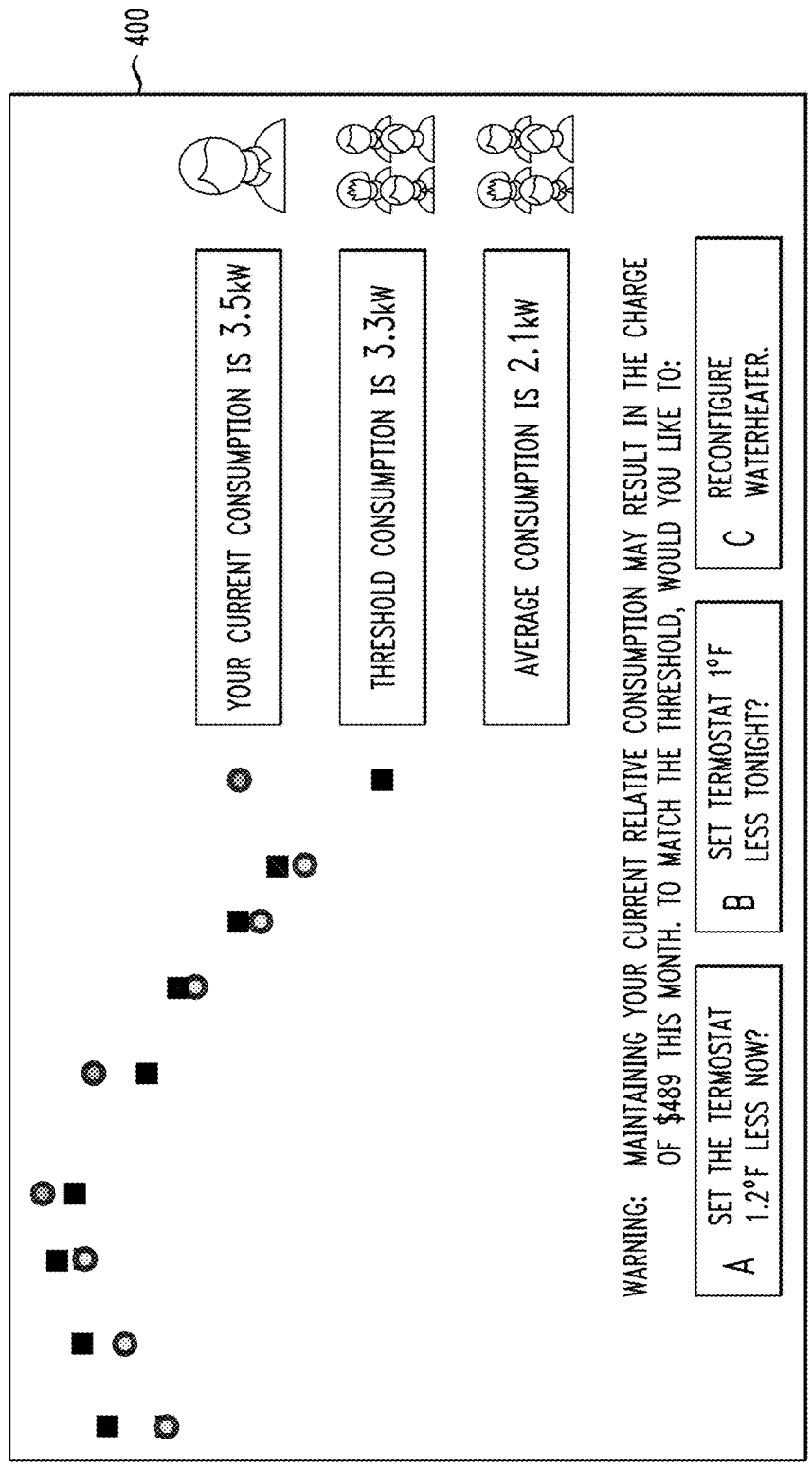
FIG. 4 depicts an example user interface screen illustrating costs for resource consumption, according to an embodiment of the present invention.

FIG. 4 depicts an example user interface screen 400 which may be presented in step 310. The user interface screen 400 includes a plot showing the trends for resource consumption, where the squares indicate the threshold consumption level, e.g., some defined percentage of resource consumption by the reference group, and the circles indicate resource consumption by the given resource consumer. The circles in lighter gray indicate that resource consumption by the given resource consumption is below the threshold consumption level, and the darker gray circles indicate that resource consumption by the given resource consumer exceeds the threshold consumption level.

The user interface screen 400 also includes certain information such as current consumption in kilowatts (kW), cumulative consumption in kilowatt hours (kWh), current in amps (A), the threshold consumption level in kWh, and the average consumption in kW. The user interface screen 400, as mentioned above, may be presented in step 310 after an alert is provided indicating that resource consumption is projected to exceed the threshold consumption level. This is indicated by the text "Warning: Maintaining your current relative consumption may result in the charge of $489 this month." A similar user interface screen, without this warning, may be provided when the resource consumption is not expected to exceed the threshold consumption level. A warning or alert may also be presented via a user interface screen in the event that resource consumption is projected to be below a lower threshold consumption level if the established cost provides for savings in such situations.

The user interface screen 400 also provides user-activatable interface features for at least partially reducing the projected additional cost. This is shown via the text "To match the threshold, would you like to:" along with options A, B and C providing specific actions to be taken to reduce resource consumption and thus at least partially reduce the projected additional cost. As described above, one or more of these options may be implemented automatically in some embodiments on transmitting or otherwise providing the alert to the user device.

Establishing the cost for resource consumption will now be described in further detail below in an illustrative example wherein resource consumption is heating costs. In this example, inputs or parameters used for establishing the cost include current heating costs, currently implemented energy efficiency measures, details of the reference group including their heating costs and energy efficiency measures, current and historical interest rates, and current and historical electricity/gas prices. Some or all of these inputs may be obtained from information stored in a knowledge base such as knowledge database 104 or knowledge database 204. Outputs may include suggested energy efficiency measures, costs of the suggested energy efficiency measures, a threshold percentile of the reference group with respect to energy use for space heating, the fraction of current costs to pay if energy use is within the threshold percentile of the reference group with respect to energy use for space heating, the additional cost for energy use above the threshold percentile, and the duration or a designated period of time to use the established cost.

A pricing structure will be described in detail below, using the following notation: $p_s$ denotes the subscription price for the resource consumer, e.g., the fixed cost; $p_p$ denotes the additional or penalty price to be paid by the resource consumer for exceeding the threshold consumption level; $p_e$ denotes the price of electricity per unit of energy, but may be generalized as the price of a resource; R denotes revenue; C denotes cost; S denotes the profit or ROI of the ESCO; $S_{target}$ denotes the desired profit or ROI of the ESCO; Q denotes the quantity of energy used by all resource consumers; $Q_T$ denotes the quantity of energy used by all resource consumers in excess of the threshold consumption level; c denotes the resource consumption of a given resource consumer; and f denotes the fraction of resource consumers exceeding the threshold consumption level.

The pricing structure described below may be used to apportion risk between the parties, e.g., between the resource consumer and the ESCO. In particular, the pricing structure may reduce the potential performance risk associated with the rebound effect. The probability distribution of energy consumption after installation of energy efficiency measures is given by P(c), and the price of electricity is $p_e$. These quantities are not known at the time the cost is established, e.g., at a time that the ESCO enters into a contract or agreement with the resource consumers. All or some subset of resource consumers may agree to pay the fixed subscription price $p_s$, with resource consumers whose consumption exceeds a threshold T paying additional price $p_p$ plus the cost of energy that is consumed above the threshold, or $(c-T)p_e$.

Figure 5:
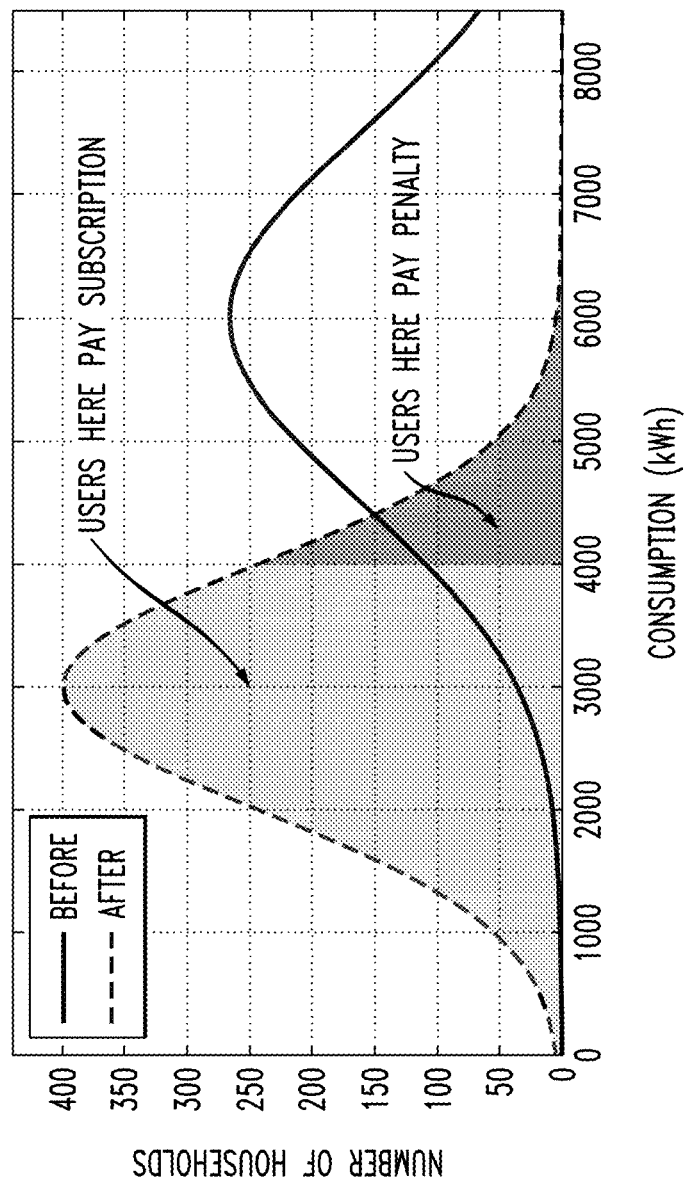
FIG. 5 is a plot illustrating costs for resource consumption, according to an embodiment of the present invention.

FIG. 5 shows a plot 500 illustrating this arrangement. In the plot 500, the number of households is plotted as a function of consumption in kWh. The two line curves indicate resource consumption before and after implementation of energy efficiency measures. As shown, after implementation of the energy efficiency measures resource consumption decreases. The light gray portion under the "after" curve indicates the resource consumers whose consumption is within the threshold consumption level and thus pay the fixed cost, while the dark gray portion under the after curve indicates the resource consumers whose consumption exceeds the threshold consumption level and thus pay the fixed cost plus the additional cost.

In this pricing structure, the revenue of the ESCO is given by equation (1) below:

$$R = p_s \int_0^\infty P(c)dc + \int_T^\infty [(c-T)p_e + p_p]P(c)dc \qquad (1)$$
$$= p_s + p_e Q_T + (p_p - p_e T)f$$

where $Q_T = \int_T^\infty cP(c)dc$ and $f = \int_T^\infty P(c)dc$. The cost for the ESCO is given by equation (2) below:

$$C = p_e \int_0^\infty cP(c)dc = p_e Q. \qquad (2)$$

The profit or ROI is given by $S = R - C = S_{target}$, where $S_{target}$ is set based on desired profits or ROI. Risks assumed by the ESCO and the resource consumers can be altered by adjusting $p_p$ based on a continuously updated P(c). For example, the apportionment of risk between the parties can be assigned by continuously adjusting $p_p$ to reflect updated values of P(c) and/or $p_e$ in accordance with equation (3) below:

$$p_p = \frac{1}{f}[S_{target} - p_s + (Q - Q_T)p_e + p_e Tf]. \qquad (3)$$

It is important to note that the threshold T may also be dynamically updated as resource consumers change their energy usage. Thus, $p_p$ may decrease if the threshold T drops due to resource consumers lowering their consumption. In some cases, $p_p$ can even become zero if the total resource consumption of the group of resource consumers becomes low enough.

Different techniques may be used to arrive at a model for the distribution of P. Non-limiting examples of such techniques are described below. In some embodiments, a behavioral model is used to account for different possible responses or viewpoints of resource consumers. Some resource consumers, for example, may be diligent in monitoring resource consumption to avoid exceeding the threshold consumption level while other resource consumers may not place an emphasis on monitoring resource consumption to avoid exceeding the threshold consumption level. Some resource consumers may try to keep their resource consumption below that of their peers, e.g., the reference group, by observing the actions of their peers and altering their behavior accordingly. For example, a given resource consumer may observe how long their peers keep their windows open or how often they water the lawn and try to keep their consumption in line with or below their peers. These and other responses can be viewed or quantified in terms of different utility functions, which can then be modeled as a subgame perfect Nash equilibrium, which is a bi-level polynomial optimization problem capturing the non-convexity of the utility functions.

Bi-level optimization can be used to model hierarchical decision making, where there is a leader and one or more followers. The followers' decisions depend on the leader's decision. When the decisions of the leader and followers can be cased as polynomial optimization problems (POPs), the following is obtained:

$$(P) \min_{x \in \mathbb{R}^n, y \in \mathbb{R}^m} f(x, y) \qquad (4)$$

subject to $g_i(x, y) \leq 0, i = 1, \ldots, s,$ $y \in Y(x) := \mathrm{argmin}_{w \in \mathbb{R}^m} \{G(x, w): h_j(w) \leq 0, j = 1, \ldots, r\},$ where f: $\mathbb{R}^n \times \mathbb{R}^m \to \mathbb{R}$, $g_i$: $\mathbb{R}^n \times \mathbb{R}^m \to \mathbb{R}$, G: $\mathbb{R}^n \times \mathbb{R}^m \to \mathbb{R}$, and $h_j$: $\mathbb{R}^m \to \mathbb{R}$ are polynomials with real coefficients, and a blanket assumption is made that the features set of (P) is nonempty, that is, $\{(x,y) \in \mathbb{R}^n \times \mathbb{R}^m : g_i(x,y) \leq 0, y \in Y(x)\} \neq \emptyset$.

Consider, as an example a bi-level POP (P) where the lower level problem is complex and the lower level problem satisfies the nondegeneracy condition and the Slater condition. Then, val($Q_k$)→val(P) where val($Q_k$) and val(P) denote the optimal value of the problems ($Q_k$) and (P), respectively. Let $\varepsilon > 0$ and consider problem ($P_\varepsilon$). Let K={(x,y):$g_i$(x,y)≤0, i=1, ..., s} and F={w:$h_j$(w)≥0, j=1, ..., r}, and suppose that cl(int(K∩($\mathbb{R}^n \times$F)))=K∩($\mathbb{R}^n \times$F). Then, $v_\varepsilon^k \to v_\varepsilon$ as k→∞ where val($P_\varepsilon$)≤$v_\varepsilon$≤$\lim_{\delta \to \varepsilon}$val($P_\delta$). In particular, for almost every $\varepsilon$, $v_\varepsilon^k \to$val($P_\varepsilon$) in the sense that, for all finite interval I⊆$\mathbb{R}_+$, $v_\varepsilon$=val($P_\varepsilon$) for all $\varepsilon \in$I except finitely many points. There exists $\varepsilon_0 > 0$ such that $v_\varepsilon^k \to$val($P_\varepsilon$) for all $\varepsilon \in (0, \varepsilon_0)$. Moreover, let $\delta_k \downarrow 0$. Let $v_\varepsilon^k = \min_{1 \leq i \leq k}$val($P_\varepsilon^i$)=val($P_\varepsilon^{i_k}$) and let ($x_k$, $y_k$) be a $\delta_k$-solution of ($P_\varepsilon^{i_k}$). Then, {($x_k$, $y_k$)} is a bounded sequence and any cluster point $(\hat{x}, \hat{y})$ of $(x_k, y_k)$ is a global minimizer of $(P_\varepsilon)$ for all $\varepsilon \in (0, \varepsilon_0)$.

Described below are techniques for choosing a subscription price and threshold which may be used in some embodiments. Discounted cash-flow calculations show that, for the assumptions outlined above, a solution exists such that the ROI for the ESCO is reasonable, e.g., >8%, and the subscription price $p_s$ is attractive to the resource consumer. The threshold consumption level can then be set to one or more desired conditions, such as optimizing the savings for the resource consumers, a ROI for the ESCO, or some combination of the two.

From the perspective of the ESCO, setting a lower threshold consumption level would lead to increased profit margins. However, a lower threshold consumption level would also lead to a less-appealing arrangement for the resource consumers and thus fewer resource consumers would enter into agreements with the ESCO resulting in lower total profit for the ESCO. Balancing these concerns, the total profit may be optimized using an uptake model for the number of resource consumers $N=N(T)$. The total profit with such a model would be $S_{total}=N(T)S_{target}(T)$.

The reference group may be chosen based on a number of parameters. In some embodiments, the reference group is chosen such that it is uniform or near-uniform with respect to such factors. In other words, the reference group is chosen such that members of the reference group have parameters values that are within respective threshold distances of a target, i.e., the parameter values of a given resource consumer or consumers. Parameters include, by way of example, the region of a facility to account for prevailing climate, construction and insulation technology, floor-space or other related volumetric measures, the numbers and age-groups of inhabitants, etc. Near-uniformity, in some cases, can be achieved in a straightforward manner. Consider, as an example, residential facilities. A single real estate developer will often build a number of similar properties within a region, thus providing a possible reference group.

As described elsewhere herein, the reference group may be anonymized for various reasons such as to alleviate privacy concerns, to prevent coordinated behavior relating to resource consumption, etc. In some embodiments, anonymization may be achieved by creating the reference group as a statistical construct based on a group of actual resource consumers. Thus, the reference group need not include a list of the identities of actual resource consumers.

The introduction of the threshold consumption level above which the resource consumer pays an additional cost provides a number of advantages in the context of a subscription type contract for ESCOs as described herein. The techniques for setting the threshold consumption level, fixed cost and additional cost also provide a number of advantages in this context. One possible advantage is that, provided resource consumers do not significantly change their behavior, a solution is possible in which no resource consumer needs to pay the additional cost and the ESCO and resource consumers receive competitive ROI. As described above, different contract types provide different methods for apportioning risk among the parties, e.g., the ESCO and the resource consumers. Leasing, shared savings and guaranteed savings contracts all assign at least some risk to the resource consumer. Chauffage type contracts reduce the risk assumed by resource consumers, but at the expense of apportioning a greater risk to the ESCO. Thus, chauffage type contracts are not typically offered by ESCOs.

Using the techniques described herein for establishing cost, ESCOs can offer chauffage type contracts to resource consumers in a manner that provides an equitable apportionment of risk between the resource consumers and the ESCOs. Resource consumers benefit from gaining access to transparent and low-risk resource consumption contracts which lower the costs for the resource consumers. In some embodiments, resource consumers have access to a fixed cost for resource consumption up to a threshold consumption level at a fraction of their normal or historical costs, e.g., a resource consumer can pay 80% of what they have been paying over the past three years unless they are among X percent of the heaviest resource consumers in a reference group. ESCOs can also benefit by gaining access to new markets, customers and a stable ROI. In general, society at large benefits from such arrangements as well via lower overall resource consumption.

As described above, a variety of risks are involved in establishing the cost for resource consumption. These risks include performance and design risk, e.g., energy efficiency measures do not work as expected. As an example, space-heating costs may not be reduced as a result of implementing energy efficiency measures, due to behavioral reasons, technical reasons, financial reasons or a combination thereof. Another risk is regulatory risk, e.g., regulators make it difficult, illegal or impossible to offer pricing as described. Customer credit risk and investment repayment risk are other examples of possible risks.

As mentioned above, there are behavioral, financial and technical aspects of the performance and design risk. Behavioral aspects of the performance and design risk include attempting to ascertain, in advance, how resource consumption will be altered after implementing energy efficiency measures. The rebound effect provides one answer. For example, a 50% per square-meter technical reduction of energy use may result in only 30% overall reduction of energy use. These numbers are presented by way of example, but the general principle is that the actual reduction in resource consumption resulting from implementing energy efficiency measures is less than the technical reduction resulting from implementing energy efficiency measures. There are various possible causes for the rebound effect. It is possible that the rebound effect is due in part to other changes made to a facility when implementing energy efficiency measures. For example, a user that installs new insulation in their home may, at the same time, build an extension on their home thus increasing the floor area. As a result, space-heating costs in this example may not be reduced to the extent expected by installing the new insulation. Carefully choosing the reference group can possibly limit the rebound effect. Establishing the cost such that there is an incentive to stay within (100–X) percent of the reference group with respect to consumption of a given resource can also possibly limit the rebound effect.

Financial aspects of the performance and design risk include, by way of example, variations in the cost of providing resources. For example, the prices of gas or fuel used for producing electricity may vary over time. Hedging techniques may be used to mitigate these risks.

Technical aspects of the performance and design risk include, by way of example, that the distribution of per-square meter space-heating costs is not singular for any particular BER or other type of reference group. This distribution may be estimated and accounted for in establishing the cost. In addition, studies by civil engineers indicate that the variation is fairly small, e.g., less than 15% from the BER estimate.

Regulatory risks refer to changes in regulations or legal requirements relating to ESCO contracts. As an example, regulations may be implemented which limit the duration of ESCO contracts. This can limit the appeal of certain types of ESCO contracts. If regulations, for example, limit that duration of ESCO contracts to just 1 year, it may be difficult to establish a cost which allows the ESCO to finance implementation of energy efficiency measures while also providing acceptable cost savings for resource consumers. Power purchase agreements are a regulatory risk that may apply in the United States. In the United Kingdom, domestic customers can switch providers at any time, although exit fees may be charged. There are certain mechanisms in the United Kingdom which allow for customers to avoid payment of such exit fees, such as when subscription prices increase. Hedging techniques may be used to account for these situations and other variations in inputs to a pricing model.

While in various embodiments described above, certain aspects of the established cost are static over a designated period of time, embodiments are not so limited. In some embodiments, the fixed cost, threshold consumption level and/or additional cost may change annually or on some other basis. The fixed cost, threshold consumption level and/or additional cost may be indexed to one or more of the future energy use by the reference group, the future price of some input such as Crude Oil Brent, a covariate of energy use such as temperature, combinations thereof, etc.

Various parameters that are used in establishing the cost may be optimized with respect to the objectives of one or more of the parties. As an example, the reference group may be suggested by the resource management system 102/ESCO 202 or by prospective resource consumers. The setting of the reference group may also be a task that is auctioned off to a third party, with multiple parties submitting bids. One or more of the parties submitting bids may be provided with some type of reward. Establishing the cost may also be a negotiation or auction between the providing party and the resource consumers. As one example, the providing party such as the resource management system 102/ESCO 202 may compute break-even parameters for the fixed cost, the threshold consumption level and the additional cost, and then negotiate or conduct an auction with resource consumers such that both parties achieve an acceptable ROI. Several different techniques may be used for the negotiation, including conducting a variant of a Dutch auction.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Figure 6:
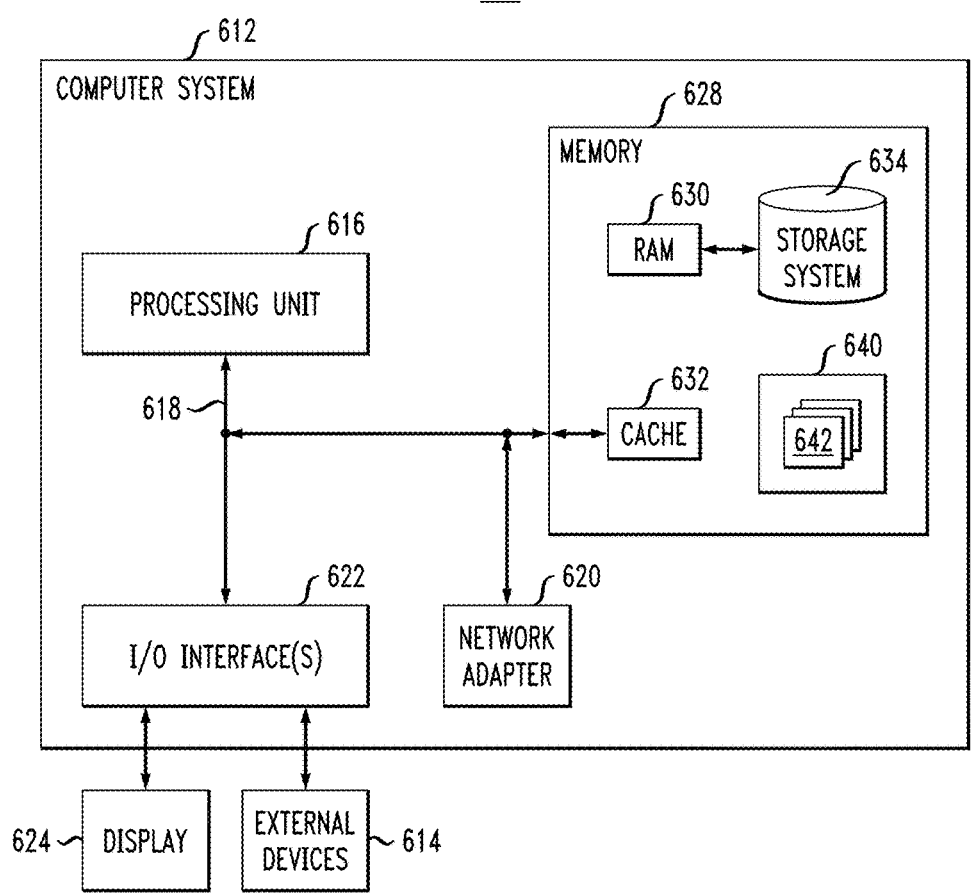
FIG. 6 depicts a computer system in accordance with which one or more components/steps of techniques of the invention may be implemented, according to an embodiment of the present invention.

One or more embodiments can make use of software running on a general-purpose computer or workstation. With reference to FIG. 6, in a computing node 610 there is a computer system/server 612, which is operational with numerous other general purpose or special purpose computing system environments or configurations. Examples of well-known computing systems, environments, and/or configurations that may be suitable for use with computer system/server 612 include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 612 may be described in the general context of computer system executable instructions, such as program modules, being executed by a computer system. Generally, program modules may include routines, programs, objects, components, logic, data structures, and so on that perform particular tasks or implement particular abstract data types. Computer system/server 612 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 6, computer system/server 612 in computing node 610 is shown in the form of a general-purpose computing device. The components of computer system/server 612 may include, but are not limited to, one or more processors or processing units 616, a system memory 628, and a bus 618 that couples various system components including system memory 628 to processor 616.

The bus 618 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

The computer system/server 612 typically includes a variety of computer system readable media. Such media may be any available media that is accessible by computer system/server 612, and it includes both volatile and non-volatile media, removable and non-removable media.

The system memory 628 can include computer system readable media in the form of volatile memory, such as random access memory (RAM) 630 and/or cache memory 632. The computer system/server 612 may further include other removable/non-removable, volatile/nonvolatile computer system storage media. By way of example only, storage system 634 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to the bus 618 by one or more data media interfaces. As depicted and described herein, the memory 628 may include at least one program product having a set (e.g., at least one) of program modules that are configured to carry out the functions of embodiments of the invention. A program/utility 640, having a set (at least one) of program modules 642, may be stored in memory 628 by way of example, and not limitation, as well as an operating system, one or more application programs, other program modules, and program data. Each of the operating system, one or more application programs, other program modules, and program data or some combination thereof, may include an implementation of a networking environment. Program modules 642 generally carry out the functions and/or methodologies of embodiments of the invention as described herein.

Computer system/server 612 may also communicate with one or more external devices 614 such as a keyboard, a pointing device, a display 624, etc., one or more devices that enable a user to interact with computer system/server 612, and/or any devices (e.g., network card, modem, etc.) that enable computer system/server 612 to communicate with one or more other computing devices. Such communication can occur via I/O interfaces 622. Still yet, computer system/server 612 can communicate with one or more networks such as a LAN, a general WAN, and/or a public network (e.g., the Internet) via network adapter 620. As depicted, network adapter 620 communicates with the other components of computer system/server 612 via bus 618. It should be understood that although not shown, other hardware and/or software components could be used in conjunction with computer system/server 612. Examples include, but are not limited to, microcode, device drivers, redundant processing units, external disk drive arrays, RAID systems, tape drives, and data archival storage systems, etc.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 7:
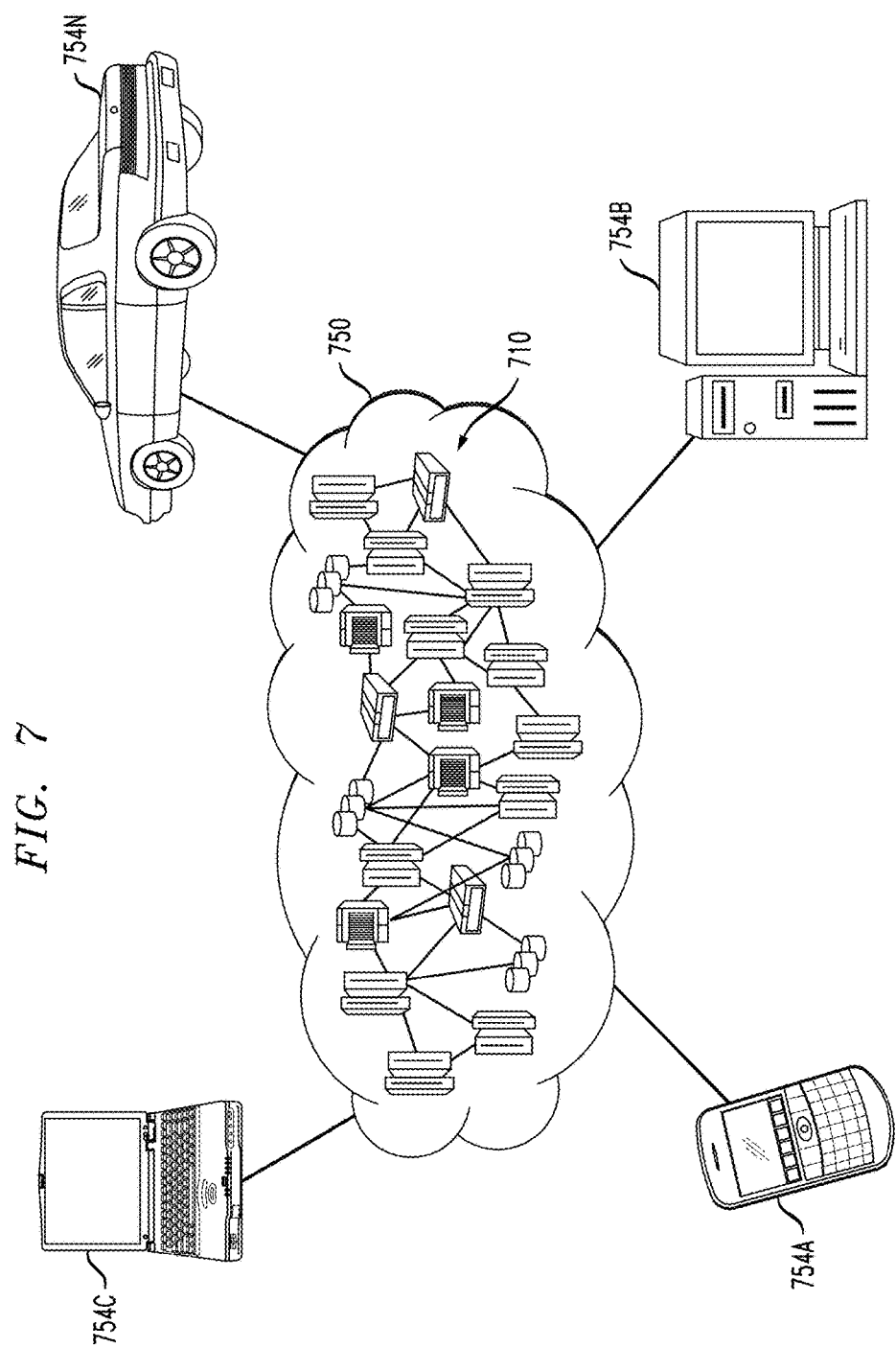
FIG. 7 depicts a cloud computing environment, according to an embodiment of the present invention.

Referring now to FIG. 7, illustrative cloud computing environment 750 is depicted. As shown, cloud computing environment 750 includes one or more cloud computing nodes 710 with which local computing devices used by cloud consumers, such as, for example, personal digital assistant (PDA) or cellular telephone 754A, desktop computer 754B, laptop computer 754C, and/or automobile computer system 754N may communicate. Nodes 710 may communicate with one another. They may be grouped (not shown) physically or virtually, in one or more networks, such as Private, Community, Public, or Hybrid clouds as described hereinabove, or a combination thereof. This allows cloud computing environment 750 to offer infrastructure, platforms and/or software as services for which a cloud consumer does not need to maintain resources on a local computing device. It is understood that the types of computing devices 754A-N shown in FIG. 7 are intended to be illustrative only and that computing nodes 710 and cloud computing environment 750 can communicate with any type of computerized device over any type of network and/or network addressable connection (e.g., using a web browser).

Figure 8:
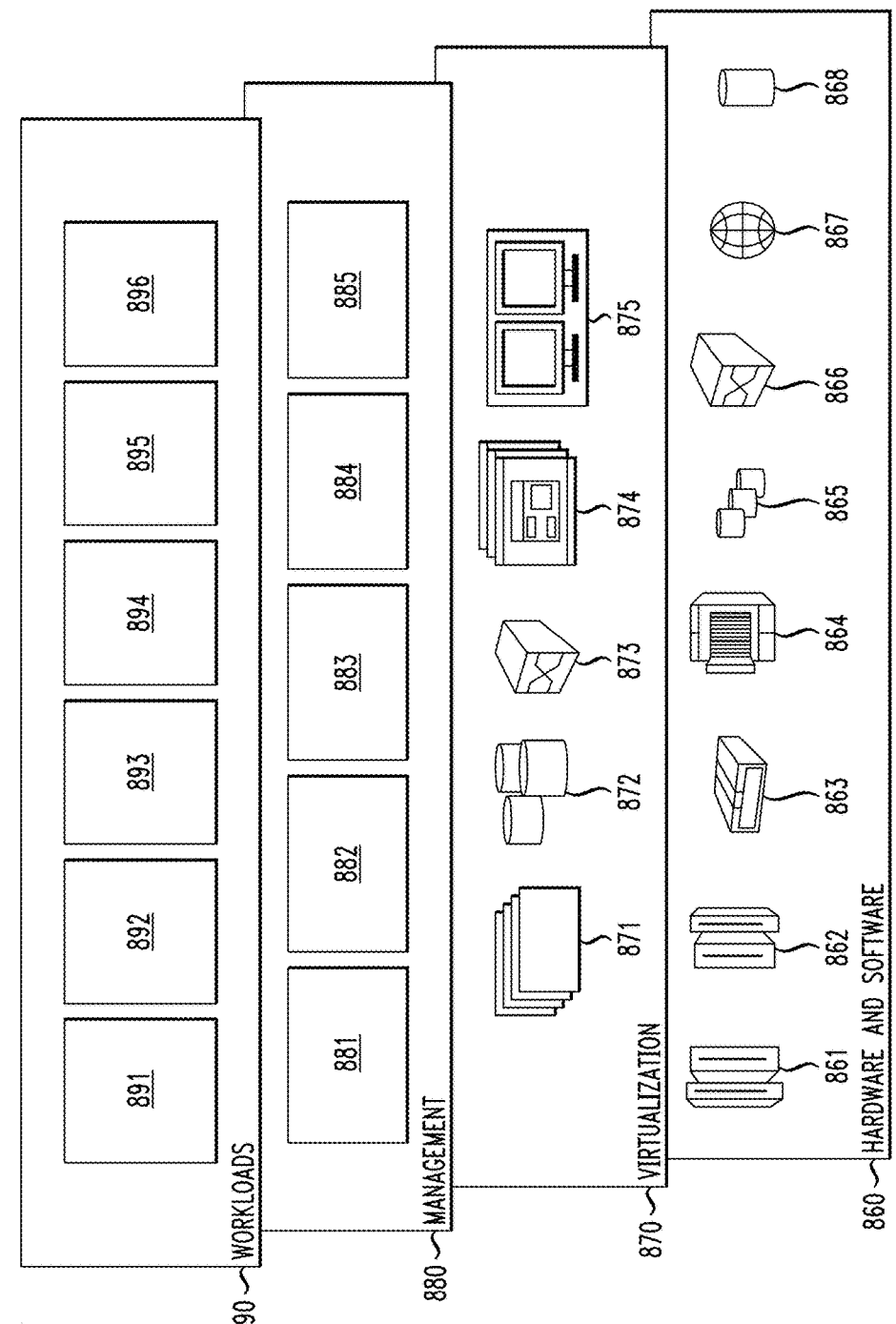
FIG. 8 depicts abstraction model layers, according to an embodiment of the present invention.

Referring now to FIG. 8, a set of functional abstraction layers provided by cloud computing environment 750 (FIG. 7) is shown. It should be understood in advance that the components, layers, and functions shown in FIG. 8 are intended to be illustrative only and embodiments of the invention are not limited thereto. As depicted, the following layers and corresponding functions are provided:

Hardware and software layer 860 includes hardware and software components. Examples of hardware components include: mainframes 861; RISC (Reduced Instruction Set Computer) architecture based servers 862; servers 863; blade servers 864; storage devices 865; and networks and networking components 866. In some embodiments, software components include network application server software 867 and database software 868.

Virtualization layer 870 provides an abstraction layer from which the following examples of virtual entities may be provided: virtual servers 871; virtual storage 872; virtual networks 873, including virtual private networks; virtual applications and operating systems 874; and virtual clients 875.

In one example, management layer 880 may provide the functions described below. Resource provisioning 881 provides dynamic procurement of computing resources and other resources that are utilized to perform tasks within the cloud computing environment. Metering and Pricing 882 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 883 provides access to the cloud computing environment for consumers and system administrators. Service level management 884 provides cloud computing resource allocation and management such that required service levels are met. Service Level Agreement (SLA) planning and fulfillment 885 provide pre-arrangement for, and procurement of, cloud computing resources for which a future requirement is anticipated in accordance with an SLA.

Workloads layer 890 provides examples of functionality for which the cloud computing environment may be utilized. Examples of workloads and functions which may be provided from this layer include: mapping and navigation 891; software development and lifecycle management 892; virtual classroom education delivery 893; data analytics processing 894; transaction processing 895; and resource consumption monitoring 896, which may perform various functions described above with respect to monitoring resource consumption by one or more resource consumers.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method comprising:
    establishing a cost for consumption of a given resource by a given resource consumer for a designated period of time, the cost comprising a fixed cost for consumption of the given resource up to a threshold consumption level for the designated time period and an additional cost associated with consumption of the given resource exceeding the threshold consumption level for the designated period of time;
    monitoring consumption of the given resource by the given resource consumer;
    determining whether resource consumption by the given resource consumer is projected to exceed the threshold consumption level over the designated time period;
    generating an alert responsive to determining that resource consumption by the given resource consumer is projected to exceed the threshold consumption level over the designated time period; and
    providing the alert for presentation via a user interface of a user device associated with the given resource consumer;
    wherein the method is performed by at least one processing device comprising a processor coupled to a memory.

2. The method of claim 1, wherein establishing the cost for consumption of the given resource comprises:
    obtaining one or more parameters of a facility associated with the given resource consumer;
    determining a reference group of resource consumers based on the obtained parameters; and
    setting the threshold consumption level based on historical resource consumption by the reference group.

3. The method of claim 2, wherein the one or more parameters of the facility comprise:
    one or more energy efficiency measures implemented in the facility;
    one or more volumetric measures of the facility;
    location of the facility; and
    occupancy information of the facility including a number of occupants and demographic information associated with the occupants.

4. The method of claim 3, wherein determining the reference group comprises identifying one or more other resource consumers having associated facilities with parameter values within respective threshold distances of the parameters of the facility associated with the given resource consumer.

5. The method of claim 4, wherein the reference group comprises the identified resource consumers, the identities of the resource consumers in the reference group being anonymized.

6. The method of claim 4, wherein the reference group comprises a statistical construct generated based on the parameter values of the identified resource consumers.

7. The method of claim 2, further comprising dynamically updating the threshold consumption level based on resource consumption by the reference group.

8. The method of claim 2, wherein the given resource comprises energy and the facility associated with the given consumer comprises a household.

9. The method of claim 1, wherein the fixed cost is a fraction of historical costs associated with consumption of the given resource by the given resource consumer, the fraction of historical costs being selected so as to at least partially offset costs of implementing energy efficiency measures relating to consumption of the given resource by the given resource consumer.

10. The method of claim 1, wherein the fixed cost is indexed to at least one of:
    future resource consumption by the reference group;
    a price associated with providing the given resource to the given resource consumer; and
    one or more covariates of consumption of the given resource.

11. The method of claim 1, wherein the fixed cost is irrespective of actual consumption of the given resource by the given resource consumer up to the threshold consumption level.

12. The method of claim 1, wherein the alert comprises a projected additional cost associated with exceeding the threshold consumption level over the designated time period based on projected resource consumption over the designated time period.

13. The method of claim 12, wherein providing the alert for presentation via the user interface of the user device associated with the given resource consumer comprises invoking a user interface application on the user device to display the projected additional cost.

14. The method of claim 13, wherein invoking the user interface application on the user device comprises presenting one or more user-activatable interface features to implement corresponding recommendations for reducing the projected additional cost.

15. The method of claim 1, wherein establishing the cost comprises selecting the fixed cost, the threshold consumption level and the additional cost so as to reduce monetary costs for consumption of the given resource by the given resource consumer.

16. The method of claim 1, wherein establishing the cost comprises selecting the fixed cost, the threshold consumption level and the additional cost so as to reduce monetary costs for consumption of the given resource by the given resource consumer subject to constraints associated with monetary costs of implementing energy efficiency measures at a facility associated with the given resource consumer.

17. An apparatus comprising:
a processing device comprising a processor coupled to a memory;
the processing device being configured:
to establish a cost for consumption of a given resource by the given resource consumer for a designated period of time, the cost comprising a fixed cost for consumption of the given resource up to a threshold consumption level for the designated time period and an additional cost associated with consumption of the given resource exceeding the threshold consumption level for the designated period of time;
to monitor consumption of the given resource by a given resource consumer;
to determine whether resource consumption by the given resource consumer is projected to exceed the threshold consumption level over the designated time period;
to generate an alert responsive to determining that resource consumption by the given resource consumer is projected to exceed the threshold consumption level over the designated time period; and
to provide the alert for presentation via a user interface of a user device associated with the given resource consumer.

18. The apparatus of claim 17, wherein the user device associated with the given resource consumer comprises a smart meter.

19. The apparatus of claim 18, wherein the processing device is the same as the user device associated with the given resource consumer.

20. A computer program product comprising a non-transitory computer readable storage medium for storing computer readable program code which, when executed, causes a computer:
to establish a cost for consumption of a given resource by a given resource consumer for a designated period of time, the cost comprising a fixed cost for consumption of the given resource up to a threshold consumption level for the designated time period and an additional cost associated with consumption of the given resource exceeding the threshold consumption level for the designated period of time;
to monitor consumption of the given resource by the given resource consumer;
to determine whether resource consumption by the given resource consumer is projected to exceed the threshold consumption level over the designated time period;
to generate an alert responsive to determining that resource consumption by the given resource consumer is projected to exceed the threshold consumption level over the designated time period; and
to provide the alert for presentation via a user interface of a user device associated with the given resource consumer.

* * * * *